United States Patent [19]
Evans et al.

[11] 3,910,122
[45] Oct. 7, 1975

[54] ANGULAR VELOCITY MEASURING APPARATUS USING IONIZED GAS IN AN ENDLESS LOOP

[75] Inventors: John L. Evans, Oakland; Jay Hoffman, Livingston; Lincoln S. Ferriss, Madison, all of N.J.

[73] Assignee: The Singer Company, Little Falls, N.J.

[22] Filed: Oct. 31, 1973

[21] Appl. No.: 411,538

[52] U.S. Cl. .......................... 73/516 LM; 73/517 A
[51] Int. Cl. ............................................. G01p 15/08
[58] Field of Search ....... 73/516 LM, 516 R, 517 R, 73/517 A, 517 B, 505

[56] References Cited
UNITED STATES PATENTS

| | | | |
|---|---|---|---|
| 3,011,347 | 12/1961 | Boitnott | 73/517 R X |
| 3,105,385 | 10/1963 | Hughes | 73/516 R |
| 3,110,185 | 11/1963 | Hughes | 73/517 R |

Primary Examiner—James J. Gill
Attorney, Agent, or Firm—T. W. Kennedy

[57] ABSTRACT

Gyroscopic apparatus is disclosed in which the reference element employed in measuring angular velocity comprises a moving stream of ionized gas. An ion collector is disposed in a conduit in which the gas stream moves and changes in angular velocity of the conduit relative to the gas stream are determined by sensing changes in ion collection.

19 Claims, 8 Drawing Figures

ANGULAR VELOCITY MEASURING APPARATUS USING IONIZED GAS IN AN ENDLESS LOOP

FIELD OF THE INVENTION

This invention relates to apparatus for use in determining angular velocity.

BACKGROUND OF THE INVENTION

Presently-known devices for determining angular velocity of an object generally comprise rate gyroscopes having an electromagnetic rotor rotated at high speed to provide a reference element of requisite angular momentum conserving character. Based on their need for moving mechanical parts, such known devices have relatively high operating power demands and have less than desirable life and reliability limits. In addition, typical applications therefor, e.g., autopilot damping, flight control and inertial guidance, have high resolution requirements and hence demand high precision in manufacture, with attendent increased production costs. In light of these considerations, substantial current need exists for gyroscopic devices of different nature. While efforts have developed somewhat more mechanically simplified gyroscopes, e.g., of the type including electrostatically-suspended rotors, these efforts have achieved less than desired results due in substantial part to the rigidity of the rotor structures involved.

SUMMARY OF THE INVENTION

It is an object of the present invention to provide a reliable and relatively low cost apparatus for use in determining angular velocity.

It is a more particular object of the invention to provide angular velocity measuring apparatus of simplified construction not involving moving mechanical parts, incorporating nonrigid rotor means and having low operating power requirements.

In the efficient attainment of these and other objects, the invention provides a casing securable to an object under study and having a conduit containing an ionizable gas, means for ionizing the gas and imparting motion thereto, means fixedly disposed with respect to the casing for collecting ions from the moving gas and means reporting changes in ion collection attendant on object rotation.

The foregoing and other objects and features of the invention will be evident from the following detailed description of preferred embodiments thereof and from the drawings wherein like reference numerals identify like parts throughout.

DESCRIPTION OF THE PREFERRED EMBODIMENTS

Figure 1:
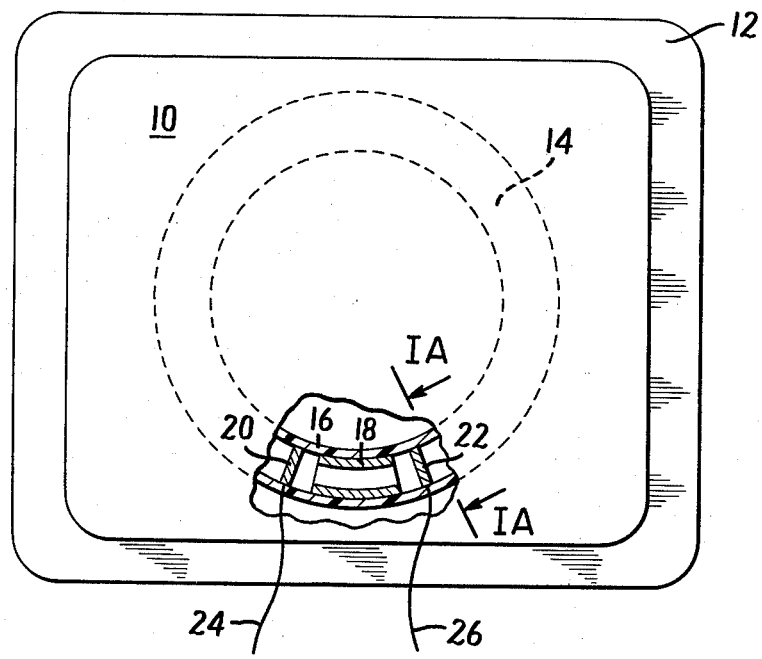
FIG. 1 is a plan view of a first embodiment of apparatus according with the invention, partly broken away to show detail.

Referring to FIG. 1, casing 10 is secured to an object 12, the angular velocity of which is to be measured. An endless conduit 14 is supported interiorly of casing 10 in a plane parallel to the plane in which angular velocity of object 12 is to be determined. As shown in the broken away portion of FIG. 1, conduit 14 is preferably comprised of a wall 16 of non-conductive material, a portion of which supports a liner 18 comprised of a radioactive material such as an oxide of Americium, emitting a 4.5 MEV alpha particle. The lining is desirably comprised of a foil containing such radioactive isotope.

An ionizable gas, e.g., nitrogen, is introduced into conduit 14 under elevated pressure, the conduit being sealed thereafter such that the gas is contained.

Under quiescent conditions, i.e., zero angular velocity of object 12, the contained gas is immobile but is seeded with ionized molecules. To this end, the gas is bombarded by alpha particles emitted by lining 18 to create such ion molecule population therein. Since lining 18 increases in electrical potential on alpha particle emission, a high electrial potential exists in the immediate vicinity of the lining and coerces movement of the ionized molecules and hence also to a slight extent the unionized gas, hereinafter collectively referred to as the gas stream.

Figure 1A:
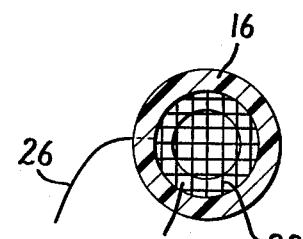
FIG. 1A is a cross-sectional view taken along line IA—IA IA of FIG. 1.

Grids 20 and 22, having a screen- or mesh-like configuration as shown in FIG. 1A, are fixedly disposed in conduit 14 transversely to the gas stream. Electrical conductors (lines) 24 and 26 are connected respectively to grids 20 and 22. Voltage supplies may be employed where it is desired to provide preselected potential difference between lining 18 and these grids.

Figure 2:
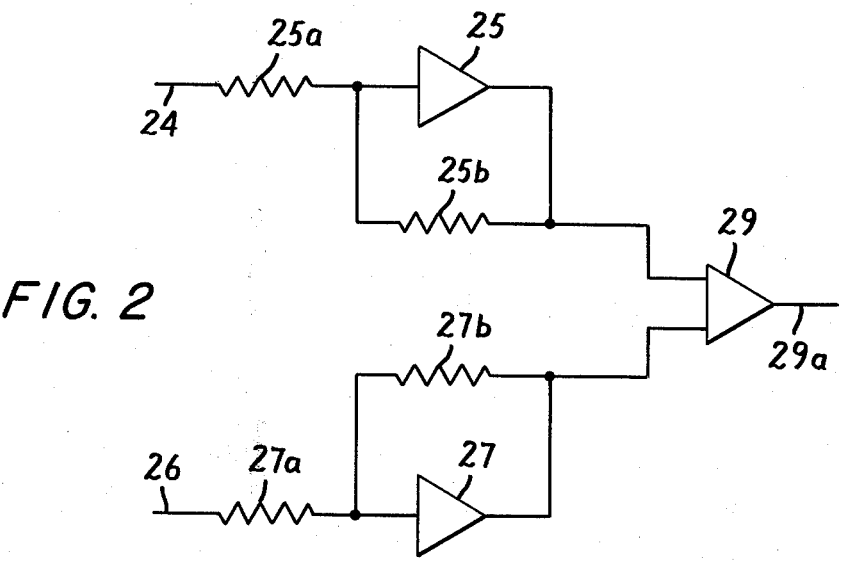
FIG. 2 illustrates circuitry for use with the FIG. 1 apparatus in providing signals indicative of angular velocity.

Under quiescent conditions, like ionized gas streams approach both of girds 20 and 22 which thus collect substantially equal numbers of ions. Since the moving gas has inherent inertia, and tends to conserve its linear momentum, angular rotation of object 12 is accompanied by relative movement between the gas streams and conduits 14 and hence grids 20 and 22. Accordingly, the relative amounts of ions collected by the grids differ on object rotation and the difference between such collected amounts of ions provides a measure of the angular velocity of the object. Any suitable difference circuit means connected to line 24 and 26 may be employed in determining object angular velocity. Referring to FIG. 2, an amplifier 25 has an input resistor 25a connected to line 24 and a feedback resistor 25b. An amplifier 27 has an input resistor 27a connected to line 26 and a feedback resistor 27b. A differential amplifier 29 receives the outputs of amplifiers 25 and 27 and provides a signal indicative of object angular velocity on its output line 29a.

In the course of time, viscous effects accompany operation of the apparatus of FIG. 1 dictating that the output signal provided by amplifier 28 will approach zero according to a negative exponential law having a time constant proportional to viscosity, whereby the gas stream ultimately will be locked to the housing. While applications arise in which such time constant can be made large in comparison to the time required for angular velocity study, thereby enabling use of the FIG. 1 apparatus with desirable results, it is generally preferable to include in the FIG. 1 apparatus means compensating for the aforementioned viscous effects, one form of such compensating means being illustrated in FIG. 3.

Figure 3:
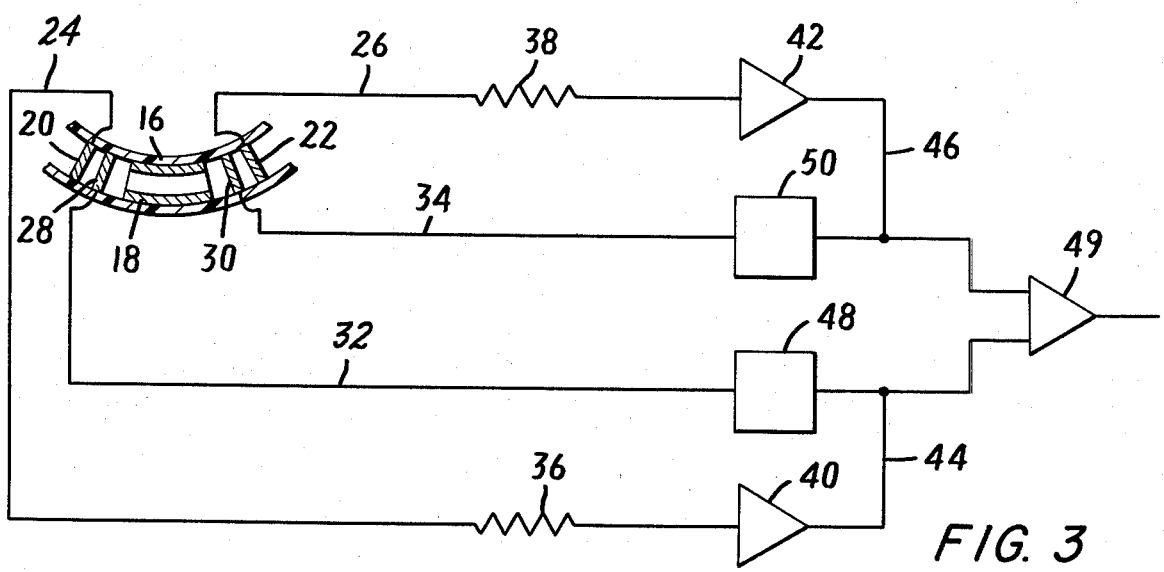
FIG. 3 illustrates a modification of the FIG. 1 apparatus and circuitry associated in providing signals indicative of angular velocity.

In FIG. 3 additional grids 28 and 30 of screen- or mesh-like configuration are disposed in conduit 14 in respective proximity to grids 20 and 22. Lines 24 and 26 of the latter grids extend to resistors 36 and 38 in turn connected to amplifiers 40 and 42. The amplifiers are connected by lines 44 and 46 respectively to differentiator circuits 48 and 50 and to first and second input terminals of difference amplifier 49. The differentiator circuits are also connected to lines 32 and 34, thus providing for application of voltage to additional grids 28 and 30.

In operation of the FIG. 3 apparatus and associated circuitry, ion collection by grids 20 and 22 is maintained substantially constant, thereby minimizing the aforementioned effects of gas viscosity. Considering clockwise rotation of object 12 in FIG. 1, grid 22 experiences motion in the direction of the gas stream and hence tends to collect increased numbers of ions. The increase in current in line 26 attendant on such motion of grid 22 provides an input voltage change at amplifier 42 which is differentiated in differentiator circuit 50 and applied to grid 30, thus giving rise to an increase in the potential in grid 30. Grid accordingly tends to weaken the electrical field associated with grid 22 compensating substractively for the tendency for increased ion collection thereby. The inputs to amplifier 49 are derived respectively at the junctions of amplifier 42 and differentiator circuit 50 and of amplifier 40 and differentiator circuit 48 at which junctions readout voltage is proportional to input rate. Amplifier 49 acts as above-discussed in the FIG. 1 apparatus to provide an output signal indicative of the difference of ion collection as between grids 20 and 22.

Figure 4:
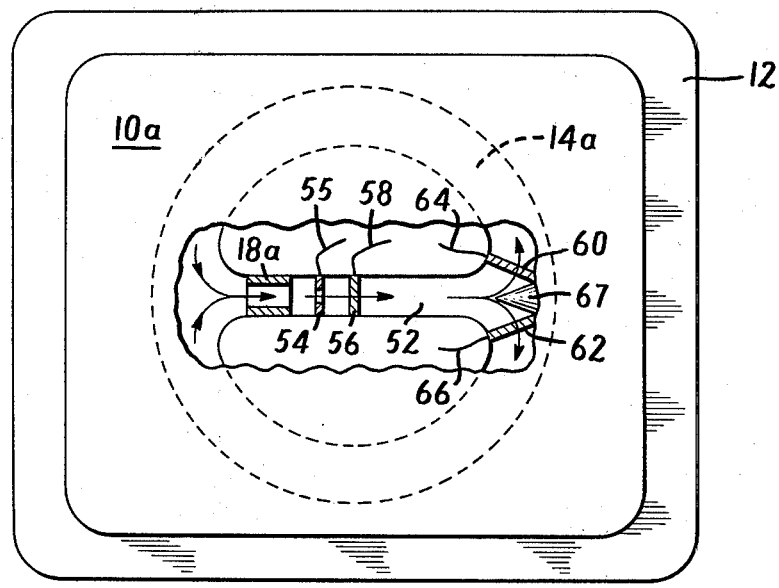
FIG. 4 is a plan view of a second embodiment of apparatus according with the invention again partly broken away to show detail.

FIG. 4 depicts a further embodiment of apparatus according with the invention wherein casing 10a includes endless conduit means 14a defined by upper and lower branch conduits opposed ends of which communicate with opposed ends of a central common conduit 52. A radioactive material liner 18a is disposed on a portion of the wall of channel 52 adjacent one end thereof. An electrode 54 having a central focusing aperture is fixedly positioned in common conduit 52 and a first voltage, positive in polarity in the case of positive gas ion generation, is applied to line 55 connected to the electrode. An accelerating grid 56 of screen- or mesh-like configuration is also disposed in channel 52 and a voltage, e.g., negative in polarity in the case of positive gas ion generation, is applied to the grid through line 58. Grids 60 and 62 are seated in the branch conduits and have lines 64 and 66 connected thereto. Second grids may be associated with each of grids 60 and 62 with compensating circuitry as discussed in connection with FIG. 3. These elements impart rectilinear motion to the gas in common conduit 52 as indicated by the arrow therein in FIG. 4.

At the right hand end of common conduit 52, a flow division occurs due to the tendency of the gas stream to conserve its linear momentum. Upon the imposition of an angular rate normal to the plane of flow in common conduit 52, respectively increasing and decreasing ion collection is experienced by electrodes 60 and 62 and may be sensed to determine angular rate of motion of object 12 by difference circuit means connected to conductors 64 and 66.

For purposes of explanation, a flow splitter 67 is shown at the exit of common conduit 52 in FIG. 4. Considering a jet having a total ion flux rate (gm./sec.) of $\dot{q}_t$ impinging on splitter 67, the jet divides equally to each side of the splitter under zero input rate. Where the jet is of width W and where a length L (cm.) exists between electrode 54 and the splitter, the incremental flow $\Delta \dot{q}$ removed from one side of the splitter and added to the other side of the splitter under change in input rate may be defined by the following equation:

$$\Delta \dot{q} = \frac{\dot{q}_t \omega \lambda L}{W} \quad (1)$$

where $\omega$ is input rotation rate (rad./sec.) and $\lambda$ is the time of rotation at that rate.

Figure 5:
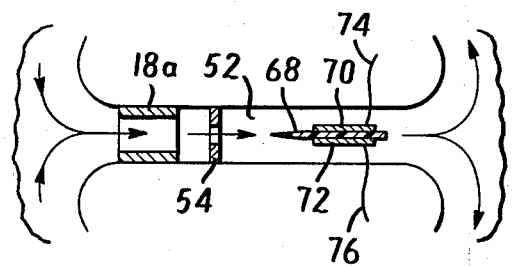
FIGS. 5 and 6 illustrate variations of the FIG. 4 embodiment.

FIG. 5 depicts a variation in the FIG. 4 apparatus wherein the ion collecting grid locations are changed. In this arrangement, an insulative flow divider 68 is disposed axially in common conduit 52 centered with the focusing aperture defined by electrode 54. Grids 70 and 72 are supported on opposite sides of divider 68 also in axial alignment with the gas stream. Lines 74 and 76 are connected to grids 70 and 72 for purposes of measuring the difference in ion collection responsive to ion flow components orthogonal to the gas stream.

Figure 6:
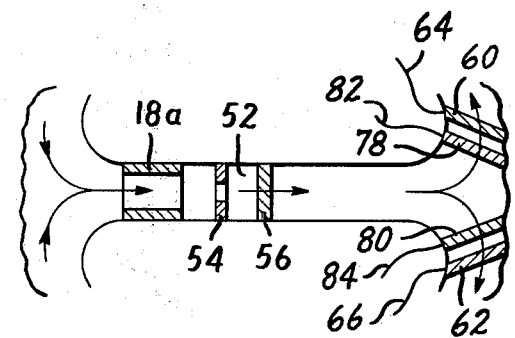

The embodiment of the invention illustrated in FIG. 6 constitutes a further variation of the FIG. 4 apparatus wherein additional grids 78 and 80 are disposed in common conduit 52 in close proximity to grids 60 and 62. Such additional grids have lines 82 and 84 connected thereto and these lines and lines 64 and 66 are interconnected by such circuit means as are shown in FIG. 7.

Figure 7:
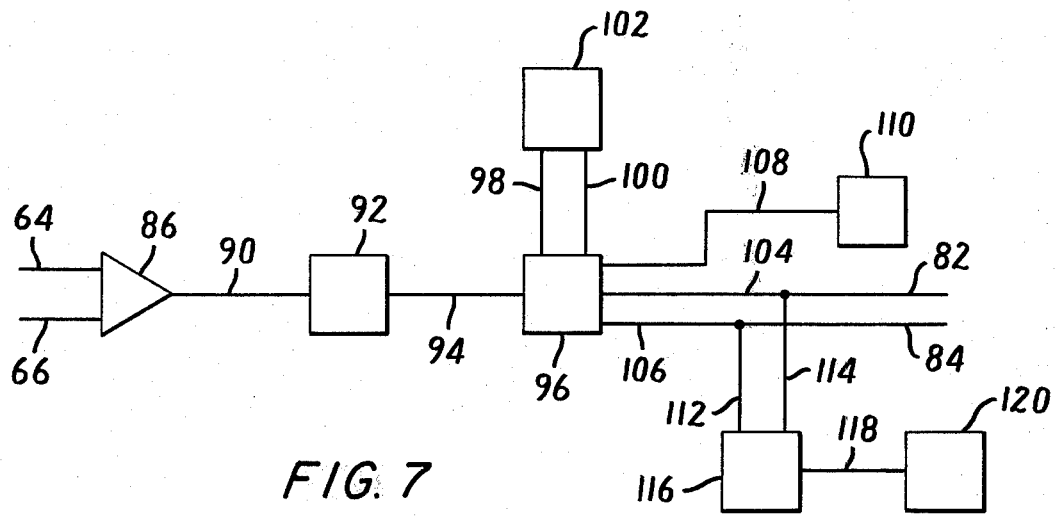
FIG. 7 illustrates readout circuitry for use in conjunction with the embodiment of FIG. 6.

In FIG. 7, the input terminals of amplifier 86 are connected to conductors 64 and 66. Current balancing is effected within amplifier 86 such that, on equal current flow in lines 64 and 66, the amplifier output on line 90 is at zero volts. On current imbalance, the amplifier provides a positive or a negative output voltage based on the direction of the imbalance as discussed below.

Line 90 provides an input to polarity comparator 92 which in turn applies a fixed potential signal to line 94 which is of positive polarity where line 64 current exceeds line 66 current and conversely of negative polarity when line 66 current exceeds line 64 current. Gating circuit 96 receives a positive-going pulse train on line 98 and a negative-going pulse train on line 100, both pulse trains being provided by pulse generator 102. Gate 96 is responsive to the polarity of the line 94 signal to apply the pulse trains to lines 104 and 106 which are connected to lines 82 and 84 of grids 78 and 80. Gate 96 further energizes line 108 such that indicator circuit 110 displays or otherwise indicates the state of the gate. Where line 94 is positive, gate 96 is in a first state and interconnects line 98 to line 104 and line 100 to line 106. Where line 94 is negative, the gate assumes a second state and interconnects line 98 to line 106 and line 100 to line 104. lines 104 and 106 are further connected by lines 112 and 114 to heterodyne multiplier filter circuit 116 which processes pulses on lines 104 and 106 to synthesize a measurable signal oscillating at the difference frequency between the pulse trains on these lines. By way of example, if the pulse rate on line 104 is 100 pulses per second (pps) and that on line 106 is 95 pps, filter 116 provides an output signal having pulse rate of 5 pps. Such signal is applied over line 118 to pulse counter 120 which counts such difference frequency.

In operation of the apparatus and circuitry of FIGS. 6 and 7, the pulses applied to lines 82 and 84 each represent a quantum of momentum increment required to restore the null condition existing prior to angular displacement of the object. By way of example, where object rotation in FIG. 6 is clockwise, grid 60 tends to experience increased ion collection whereas grid 62 tends to experience decreased ion collection. Pulses are applied to line 82 of polarity repelling positive gas ions and pulses are applied to grid 84 of polarity attracting positive gas ions. Ion flux deceleration and acceleration occur in the respective conduit branches until the output of amplifer 86 returns to zero. Under the restored quiescent conditions, counter 120 provides indication of the number of pulses involved in attaining this state and indicator circuit 110 provides indication of the direction of such measured rate vector.

The invention further contemplates the use of a single grid as a further simplification of the FIG. 1 two-grid arrangement. In such simplified form, the current in such single grid may be monitored by suitable comparator circuit means detecting change thereof with time.

Apparatus may evidently be constructed incorporting combinations and sub-combinations of the foregoing preferred embodiments. For example, the means in FIGS. 6 and 7 for imparting motion to the contained gas for reducing changes in ion collection and positively driving gas stream variation to a null condition may be included in the FIG. 1 apparatus. As discussed above, the FIG. 4 apparatus itself may be improved by modification in accordance with the grid pair arrangement in FIG. 3. Furthermore, the particularly illustrated circuit means, while particularly beneficial in attaining the results of the invention, may be substituted for by like functioning circuitry. As will be appreciated the preferred embodiments are intended in an illustrative and not in a limiting sense. The true spirit and scope of the invention is defined in the following claims.

What is claimed is:

1. Apparatus for use in measuring the angular velocity of an object comprising:
    a. conduit means forming a closed loop fixed to said object for containing a gas;
    b. an ionizable gas contained in said conduit means;
    c. ion collecting means comprising first and second ion collecting grids spacedly disposed and fixedly positioned in said conduit;
    d. means located between said first and second ion collecting grids for ionizing said contained gas and thereby moving the same relative to said conduit; and
    e. means responsive to said first and second ion collecting grids for providing an output signal indicative of changes in ion collection thereby.

2. The apparatus claimed in claim 1 wherein said gas ionizing means comprises means for directing radioactive particles into said contained gas.

3. The apparatus claimed in claim 2 wherein said radioactive particle directing means comprises radioactive material disposed in said conduit means.

4. The apparatus claimed in claim 1 wherein said conduit means defines a single endless conduit therefore.

5. The apparatus claimed in claim 4 wherein said output signal providing means comprises difference circuit means having first and second input terminals respectively connected to said first and second grids, and a further terminal providing said output signal.

6. The apparatus claimed in claim 3 wherein said radioactive material is contained in a lining of at least a portion of said conduit means.

7. The apparatus claimed in claim 6 wherein said conduit means defines a single endless conduit and wherein said first and second ion collecting grids are disposed in said endless conduit at respectively opposite ends of said lining.

8. The apparatus claimed in claim 7 wherein said output signal providing means comprises difference circuit means having first and second input terminals respectively connected to said first and second grids, and a further terminal providing said output signal.

9. The apparatus claimed in claim 1 and further including circuit means having a differentiator circuit for connecting said first grid to said second grid.

10. The apparatus claimed in claim 1 wherein said said first and second ion collecting grids comprise first and second pairs of ion collecting grids, said grid pairs being spacedly disposed in said conduit means, said apparatus further including circuit means having a first differentiator circuit for inter-connecting the grids in said first grid pair and a second differentiator circuit for inter-connecting the grid in said second grid pair, said output signal providing means comprising a difference circuit having first and second input terminals respectively to said first and second differentiator circuits and a further terminal providing said output signal.

11. The apparatus claimed in claim 10 wherein said gas ionizing means comprises radioactive material disposed in said conduit means between said first and second grid pairs.

12. The apparatus claimed in claim 1 wherein said means for ionizing located between said first and second grids are located in a further conduit having one end communicating with said closed loop conduit at a point between said first and second grids and another end communicating with said loop conduit at a point opposite thereto to thereby form a pair of endless conduits each including said further conduit with said first and second ion collecting grids respectively disposed in one and the other pair of endless conduits.

13. The apparatus claimed in claim 12 wherein said gas ionizing means comprises radioactive material disposed in said further conduit.

14. The apparatus claimed in claim 13 including a further grid disposed in said further conduit for accelerating movement of ions therein.

15. The apparatus claimed in claim 14 including means disposed in said further conduit for focusing ions therein.

16. Apparatus claimed in claim 12 and further including flow divider means disposed in said further conduit and wherein said first and second grids are supported by said flow dividers means on opposite sides thereof.

17. Apparatus claimed in claim 12 and further including:
 a. third and fourth grids associated with said first and second grid respectively and disposed in said looped conduit in said one and other of said pair of endless conduits respectively and
 b. circuit means receiving said output signal and applying further signals to said third and fourth grids for imparting motion to said contained gas for reducing change in ion collection by said first and second grids.

18. The apparatus claimed in claim 1 including means responsive to said output signal providing means for imparting motion to said contained gas for reducing said changes in ion collection.

19. The apparatus claimed in claim 18 wherein said means responsive to said output signal includes third and fourth grids disposed in said conduit means adjacent said first and second collecting grids respectively and circuit means receiving said output signal and applying a further signal to said third and fourth grid for imparting motion to said contained gas for reducing changes in ion collection by said first and second ion collecting grids.

* * * * *